UNITED STATES PATENT OFFICE.

JAKOB SCHMID, OF BASLE, SWITZERLAND, ASSIGNOR TO THE SOCIETY OF CHEMICAL INDUSTRY, OF SAME PLACE.

AZO DYE.

SPECIFICATION forming part of Letters Patent No. 402,980, dated May 7, 1889.

Application filed September 24, 1888. Serial No. 286,239. (No specimens.)

*To all whom it may concern:*

Be it known that I, JAKOB SCHMID, a citizen of Switzerland, residing at Basle, Switzerland, have invented new and useful Improvements in the Manufacture of New Azo Bodies Suitable for the Production of Coloring-Matters, of which the following is a specification.

This invention relates to the production of new azo bodies by combining alphadiazonaphthaline with metaamidophenol or its dialkylized derivatives, viz., dimethylamidophenol and diethylmetaamidophenol, which substances form the subject-matter of a previous application filed April 5, 1888, No. 269,711.

In carrying out my invention I proceed as follows: 14.3 kilograms of alphanaphthylamine, and 25.5 kilograms of muriatic acid of thirty-three per cent. Baumé are dissolved, and by the addition of 7.3 kilograms of sodium nitrite, in the manner well known to chemists, converted into the diazo compound (diazonaphthaline.) The diazonaphthaline thus obtained is then mixed with a solution consisting of 10.9 kilograms of metaamidophenol, two hundred kilograms of water, and twelve kilograms of muriatic acid. When acetate of sodium is added, the combination product is separated in the form of an orange yellow or brown mass. The combination can also be effected in an alkaline solution instead of in an acid. In this case the solution of alpha-diazonaphthaline obtained, as above described, is caused to act upon a refrigerated solution containing 10.9 kilograms of metaamidophenol, one hundred and twenty kilograms of soda lye of 38° Baumé, and two hundred kilograms of water. The new azo body at once separates in the form of a brown mass (alphaazonaphthaline metaamidophenol.) This deposit is filtered, pressed, and dried, when it represents a brilliant green powder, which is almost insoluble in water, but soluble in alcohol and glacial acetic acid with an orange-yellow color.

The diakylized derivatives are produced in an analogous manner as the azonaphthaline metaamidophenol by causing the diazo compound obtained from 14.3 kilograms of naphtylamine to act upon 13.9 kilograms of dimethyl metaamidophenol or upon 16.5 kilograms of diethyl metaamidophenol in an alkaline, or, preferably, in an acid solution.

The azo bodies resulting from this treatment possess exactly the same properties as the azo body obtained from metaamidophenol, and they can be used with advantage in the preparation of coloring-matters. The formulas are as follows:

First, alphaazonaphthaline metaamidophenol =

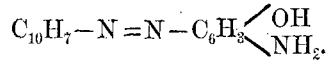

Second, alphaazonaphthaline dimethylmetaamidophenol =

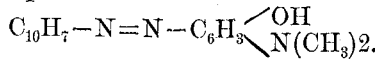

Third, alphaazonaphthaline diethylmetaamidophenol =

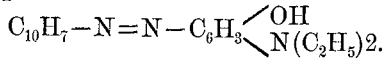

What I claim as new, and desire to secure by Letters Patent, is—

The production of azo bodies by the combination of alphadiazonaphthaline with metaamidophenol or its dialkylized derivatives, substantially as described.

In testimony whereof I have hereunto set my hand and seal in the presence of two subscribing witnesses.

JAKOB SCHMID. [L. S.]

Witnesses:
GEORGE GIFFORD,
CHAS. A. RICHTER.